United States Patent
Amberg et al.

(12) 
(10) Patent No.: US 6,279,155 B1
(45) Date of Patent: Aug. 21, 2001

(54) METHOD OF INSTALLING SOFTWARE ON AND/OR TESTING A COMPUTER SYSTEM

(75) Inventors: Richard D. Amberg; Roger Wong, both of Austin, TX (US); Michael Lynch, Raheen (IE)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,758

(22) Filed: Jan. 26, 1999

(30) Foreign Application Priority Data

Apr. 8, 1998 (IE) .................................................... S980263

(51) Int. Cl.[7] ........................................................ G06F 9/44
(52) U.S. Cl. .............................................. 717/11; 710/104
(58) Field of Search ................................ 710/104; 717/11

(56) References Cited

U.S. PATENT DOCUMENTS

| | | | |
|---|---|---|---|
| 5,859,969 | * | 1/1999 | Oki et al. ........................... 395/200.3 |
| 5,909,581 | * | 6/1999 | Park ..................................... 395/712 |
| 6,021,276 | * | 2/2000 | Demke et al. ........................ 395/712 |
| 6,023,586 | * | 2/2000 | Gaisford et al. ..................... 395/712 |
| 6,064,821 | * | 5/2000 | Shough et al. ....................... 395/712 |
| 6,182,285 | * | 1/2001 | Bleizeffer et al. ..................... 717/11 |
| 6,199,204 | * | 3/2001 | Seamus .................................. 717/11 |

FOREIGN PATENT DOCUMENTS

| | | |
|---|---|---|
| 0592079 | 4/1994 | (EP) . |
| 2291517 | 1/1996 | (GB) . |
| 2309104 | 7/1997 | (GB) . |

OTHER PUBLICATIONS

Continuus Software Corporation, Product Continuus, Obj-Make Guide Manual 1996.*

David D. Busch, PC/MS DOS 4.0 for Hark Disk Users, 150–51, 265–66, 1989.*

Microsoft Press, Computer Dictionary: Third Edition, 253–54, 284, 288, 465, 1997.*

* cited by examiner

Primary Examiner—Mark R. Powell
Assistant Examiner—Todd Ingberg
(74) Attorney, Agent, or Firm—Haynes and Boone, L.L.P.

(57) ABSTRACT

A method of installing software on and/or testing a computer system includes providing a step sequence having a plurality of software installation and/or testing steps to be executed in an order determined by the step sequence, and reading and executing consecutive steps from the step sequence. The method further includes updating, in respect of each step which is executed, a file with data relating to the current status of the installation and/or testing, and, prior to the execution of each step, determining from the file if that step is properly the next consecutive step in the step sequence.

9 Claims, 14 Drawing Sheets

METHOD OF INSTALLING SOFTWARE ON AND/OR TESTING A COMPUTER SYSTEM

This application relates to co-pending U.S. patent application Ser. No. 08/919,959, filed on Aug. 29, 1997, entitled SOFTWARE INSTALLATION AND TESTING FOR A BUILD-TO-ORDER COMPUTER SYSTEM, naming Richard D. Amberg, Roger W. Wong and Michael A. Brundridge as inventors.

This application relates to co-pending U.S. patent application Ser. No. 08/920,773, filed on Aug. 29, 1997, entitled SOFTWARE INSTALLATION AND TESTING FOR A BUILD-TO-ORDER COMPUTER SYSTEM, naming Richard D. Amberg, Roger W. Wong and Michael A. Brundridge as inventors.

This application relates to co-pending U.S. patent application Ser. No. 08/921,438, filed on Aug. 29, 1997, entitled DATABASE FOR FACILITATING SOFTWARE INSTALLATION AND TESTING FOR A BUILD-TO-ORDER COMPUTER SYSTEM, naming Richard D. Amberg, Roger W. Wong and Michael A. Brundridge as inventors.

BACKGROUND

The disclosures herein relate to a method of installing software on and/or testing a computer system.

These co-pending applications are incorporated herein by reference in their entirety, and are assigned to the assignee of this invention.

These co-pending applications are incorporated herein by reference in their entirety, and are assigned to the assignee of this invention.

Personal computer systems in general and IBM compatible personal computer systems in particular have attained widespread use for providing computing power to many segments of society. A personal computer system can usually be defined as a desk-top, floor-standing, or portable microcomputer that includes a system unit having a system processor and associated volatile and non-volatile memory, a display monitor, a keyboard, one or more diskette drives, a fixed disk storage device and an optional printer.

It has been known to install software and to perform tests on computer systems before they are shipped to businesses or individual customers. The goal of software installation and testing is to efficiently produce a useful, reliable computer system which may be delivered to businesses and individuals free from errors and ready to run. In general, testing detects and analyzes errors that occur in both the hardware and software portions of the computer system. A partial list of computer system hardware tests might include diagnostics upon hardware components such as a processor, memory, a disk storage device, an audio device, a graphics device, a keyboard, a mouse, and a printer. Software installation often includes loading a desired package of software onto the computer system, preparing appropriate environment variables for the computer, and preparing appropriate environment variables for the computer, and preparing appropriate initialization files for the loaded software. Software testing often includes making sure that a desired version of software has been installed onto the computer system and the appropriate drivers are present on the computer system.

It has been known in the industry to install software and to test computer systems during manufacture by performing a fixed procedure before they are shipped to customers. For instance, a diskette containing certain diagnostic tests for a certain type of computer system is created. The diskette includes lengthy, often-complicated batch files which direct the software installation and diagnostic processes. The diskette further contains all the executable files for performing tests on the computer system being purchased.

Each computer system being built is provided with a respective copy of this diskette. These diskettes accompany the computer systems being built around a factory floor during the manufacturing process, tests being run on the respective computer system according to the order inherent in the batch file. If a modification needs to be made to the process, the batch file is correspondingly changed by adding to or removing portions from the batch code. That change to the batch file results in a corresponding change to testing parameters (including the sequence in which the tests are run) of each subsequent computer system being manufactured, for each computer system shares the same batch file diagnostic procedure.

While diagnostic arrangements of this kind have exhibited some (degree of usefulness in increasing the reliability of computer systems prior to shipment, room for improvement remains. For instance, as testing continues to become more complicated and thorough, batch files and executable files of the diagnostic tests often exceed the storage capabilities of a diskette. Furthermore, it is often difficult or impossible to customize testing and software installation procedures for a single build-to-order computer system or for a certain family of computer systems without modifying the testing for other systems or families. Moreover, it is difficult or impossible to modify the order of software installation or testing for a single build-to-order computer system or for a certain family of computer systems without modifying the order for other systems and families. Finally, the often-complicated nature of current batch file structures sometimes makes it difficult for manufacturers to troubleshoot or maintain testing and software installation procedures quickly and efficiently.

Therefore, what is needed is to provide a method of installing software on and/or testing a computer system which avoids limitations associated with the prior art.

SUMMARY

One embodiment accordingly, provides a method of installing software on a computer system by providing a step sequence including a plurality of software installation steps to be executed in an order determined by the step sequence, and reading and executing consecutive steps from the step sequence.

DETAILED DESCRIPTION

Figure 1:
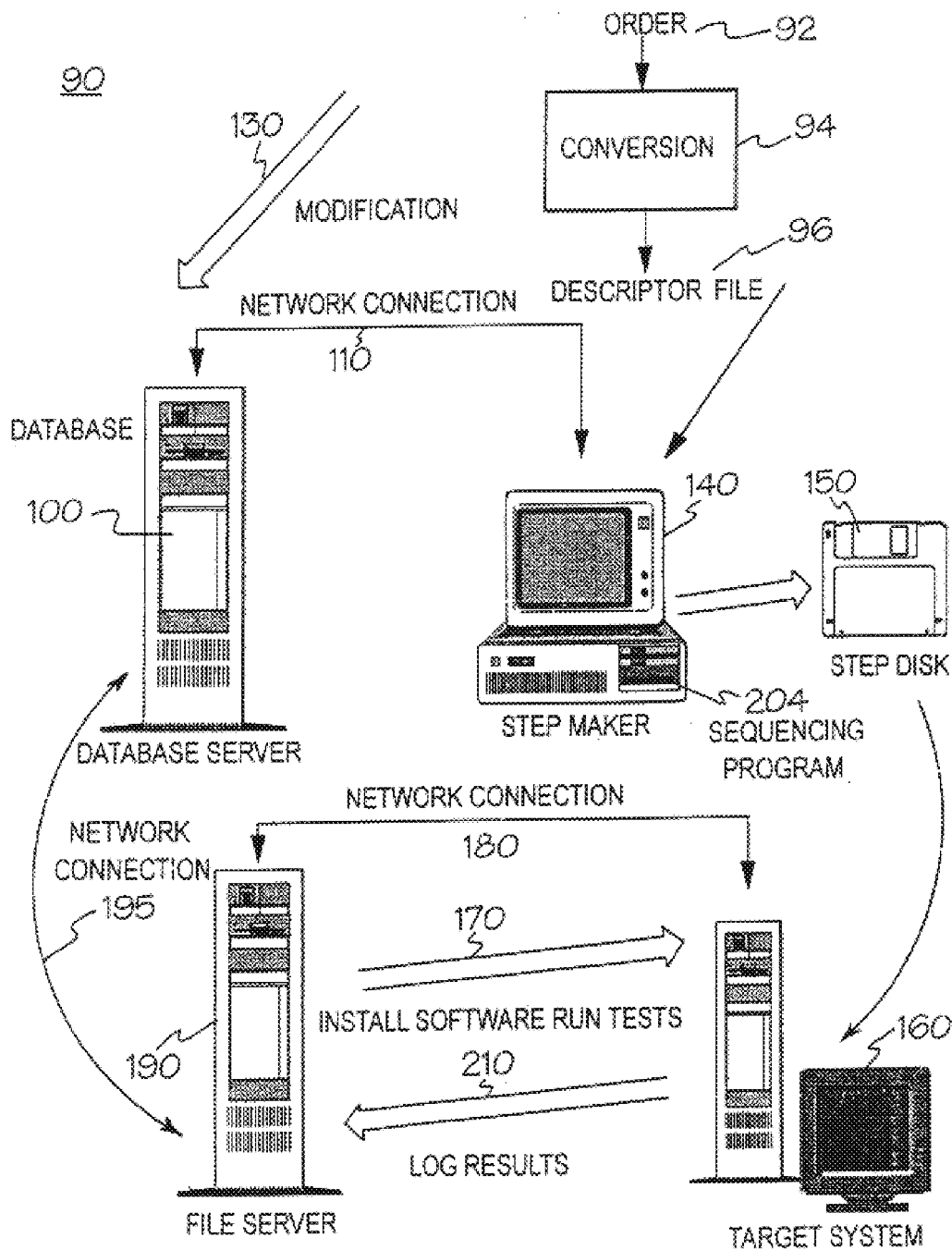
FIG. 1 is a schematic diagram illustrating an embodiment of software installation and testing.

FIG. 1 is a schematic diagram of a software installation and testing system 90 at a computer system manufacturing site. In operation, order 92 is placed to purchase build-to-order target computer system 160. Target system 160 is to be manufactured to contain a plurality of hardware and software components. For instance, target system 160 might include a certain brand of hard drive, a particular type of monitor, a certain brand of processor, and a particular version of an operating system. Before target system 160 is shipped to the customer, the plurality of components are installed and tested. Such software installation and testing advantageously ensures a reliable, working computer system which is ready-to-run upon being received.

Because different families of computer systems and different individual computer components require different software installation and testing steps, it is necessary to determine which tests need to be run on target system 160 and in what order those tests should be executed so as to achieve an effective software installation and testing process. Step maker 140 is a computer system configured to sequence the software installation and testing steps to be run on target system 160. To sequence the software installation and/or testing steps, step maker 140, and more particularly, sequencing program 204 residing on step maker 140, first reads a plurality of component descriptors from descriptor file 96. Descriptor file 96 is provided by converting an order 92, which corresponds to s desired computer system having desired components, into a computer readable format via conversion module 94.

Component descriptors are computer readable descriptions of the components of target system 160 which components are defined by the order 92. In the preferred embodiment, the component descriptors are included in a descriptor file called a system descriptor record which is a computer readable file containing a listing of the components, hardware and/or software components, to be installed onto target system 160. Having read the plurality of component descriptors, sequencing program 204 retrieves a plurality of software installation and/or testing steps corresponding to the component descriptors from database 100 over network connection 110. Network connection 110 may be any network connection well-known in the art, such as a local area network, an intranet, or the internet. The information contained in database 100 may be updated through a modification depicted by arrow 130.

Having retrieved the software installation and/or testing steps appropriate for target system 160, sequencing program 204 sequences the steps in a predetermined order according to sequence numbers corresponding to each step. Having sequenced the steps required for target system 160, sequencing program 204 writes a series of output files to step disk 150. In the embodiment set forth in FIG. 1, the output files include text files containing command lines appropriate for executing the appropriate software installation and/or testing steps upon target system 160. The execution is performed in the predetermined order according to the sequence numbers corresponding to each step. Step disk 150 accompanies target system 160 on the factory floor where tests are run directly from step disk 150 or, alternatively, from file server 190, connected to target system 160 via network connection 180. Preferably, network connection 180 is a generic network device plugged into a corresponding network port of the target computer system. Following the execution of the software installation and testing steps, results of the installation and tests are logged back to file server 190 over network connection 180.

Figure 2:
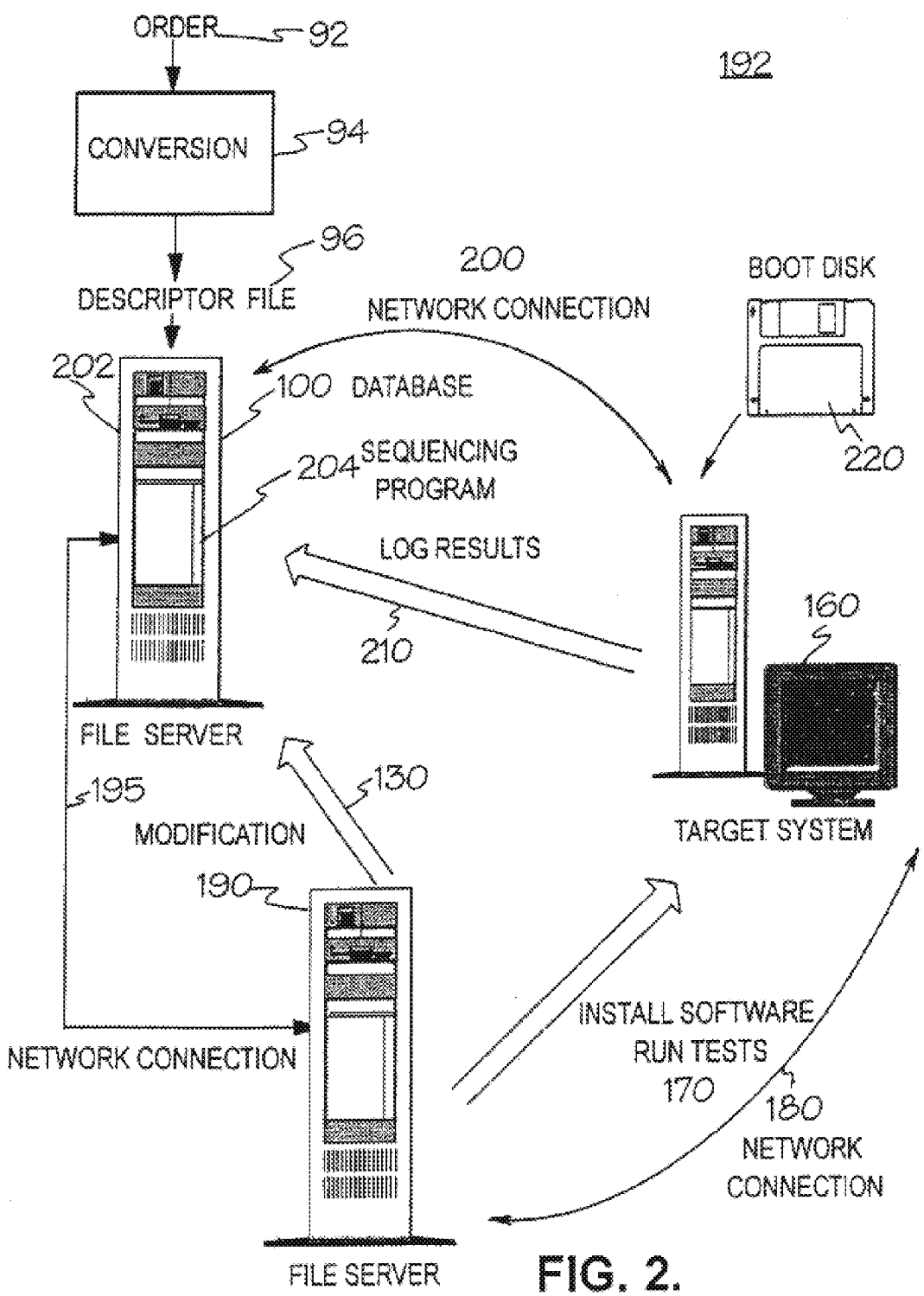
FIG. 2 is a schematic diagram of software installation and testing according to another embodiment.

FIG. 2 is a schematic diagram of software installation and testing system 192 pursuant to another embodiment of the present invention. A customer places order 92 to purchase build-to-order target computer system 160. Target system 160 is to be manufactured to contain a plurality of components which components may include both hardware and/or software components. Before target system 160 is shipped to the customer, the plurality of components are installed and tested. Such installation and testing advantageously ensures a reliable, working computer system which is ready-to-run upon being received by the customer.

To sequence the software installation and testing steps, sequencing program 204 reads a plurality of component descriptors from descriptor file 96. Order 92 is converted into descriptor file 96 via conversion module 94. Component descriptors are computer readable descriptions of the components of target system 160. In the preferred embodiment, the component descriptors are included in a descriptor file called a system descriptor record, a computer readable file containing a listing of each component, both hardware and software, to be installed onto target system 160. The system descriptor record may be stored directly on file server 202. Sequencing program 204 retrieves a plurality of software installation and/or testing steps corresponding to the component descriptors from database 100. Having retrieved the appropriate software installation and/or testing steps for target system 160, sequencing program 204 sequences the steps in a predetermined order according to sequencing numbers corresponding to each step. Having sequenced the steps required for target system 160, sequencing program 204 directs the execution of the software installation and testing steps upon target system 160 in the predetermined order via network connections 195 and 180. It is desired that network connection 200 be a generic network device plugged into a corresponding port of target system 160. Network 195 may be any communication connection well-known in the art. Following the execution of the software installation and/or testing steps, results of the installation and tests are logged back to file server 202 over network connection 200 or stored within an appropriate database. As apparent from the illustration, there is no need for separate step maker computer system 140 of FIG. 1. Additionally, step disk 150 is not necessary. Rather, only boot disk 220, which is configured to boot target system 160, is needed to accompany target system 160 on the factory floor.

Having generally described the software installation and testing systems, attention will now be turned to describing the operation of the systems set forth in FIGS. 1 and 2 in more detail.

Figure 3A:
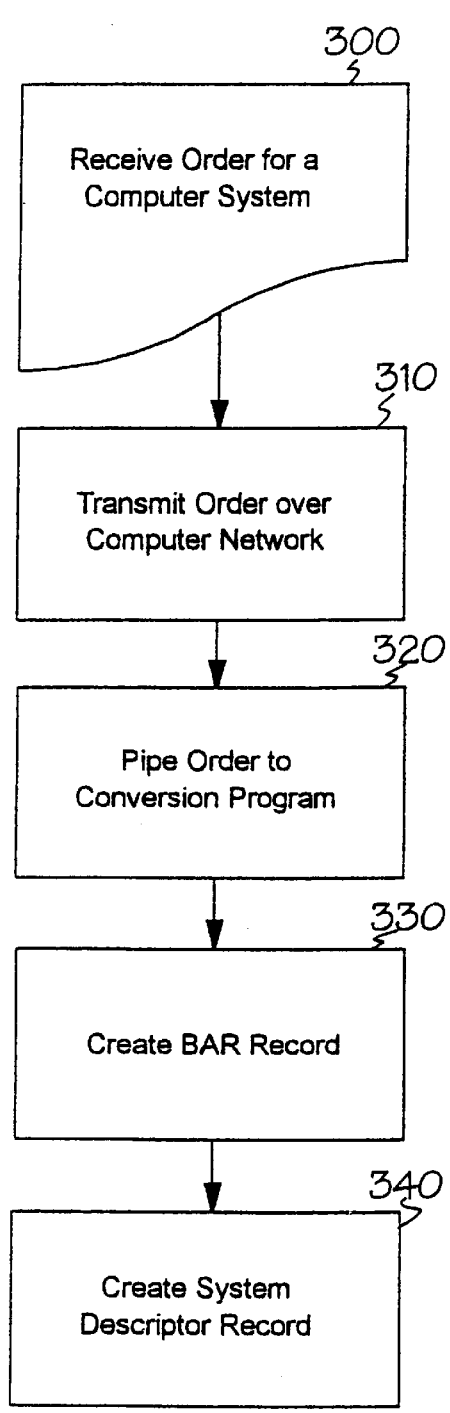
FIG. 3A is a flowchart illustrating an embodiment for converting a computer order into a system descriptor record according to the present invention.

FIG. 3A depicts the preferred process in which an order for a computer system is converted into a computer readable system descriptor record. More specifically, in item 300, an order is received for a target computer system. This order may be in any one of countless forms. For instance, different ordering formats are possible as well as different order delivery mechanisms. For example, orders for a target computer system may be placed by telephone, by mail, or over computer networks (e.g., over the internet). Regardless of the means of taking or the form of the order, the order includes the type of target computer system which a customer desires to purchase and, possibly, an explicit listing of the particular components the customer wishes the target computer system to include. After the order is received, control transitions to transmit module 310 during which the target computer system order is transmitted over a computer network to a manufacturing system (not shown) which produces the target computer system. The target computer system order is also provided to the software installation and testing system where it is piped into a conversion program in module 320. The computer network used in module 310 may be of any type well-known in the art.

The conversion program converts the target computer system order to a record useful for the manufacturing process. More specifically, the conversion program converts the computer order first into a record called a BAR file at module 330. Preferably, the BAR file contains a unique identifier which identifies the specific target computer system being manufactured. The BAR file also contains a detailed listing of components, which may include both hardware and software, to be included with the target system. Further, it is desired that the BAR file contain manufacturer-specific part numbers or other useful identifiers for each component. Finally, the BAR file may contain customer-specific information such as name, address, and phone number.

Following the creation of the BAR file in module 330, a system descriptor record is created at module 340. A system descriptor record, in the preferred embodiment, is a computer-readable file which is descriptive of the hardware and software components to be included with the target computer system. In a preferred embodiment, the system descriptor record contains a list of components of the target system in a format including hardware tags, software tags, information tags, and comments. A hardware tag identifies to sequencing program 204 that information following the tag relates to a hardware component. Similarly, the software tag identifies information following the tag as being related to a software component. The information tag indicates that general information is to follow. Comments allow for various statements to be included into the system descriptor record which are ignored by sequencing program 204. It is desired that the system descriptor record be a text file which is human-readable and easy to understand. Such a file advantageously allows for easy troubleshooting and maintenance of the installation and testing process. It will be appreciated that the system descriptor record could be any list of unique identifiers that correspond to a unique set of tokens, for example, in a simple example, the system descriptor record may be a list of part numbers.

Figure 3B:
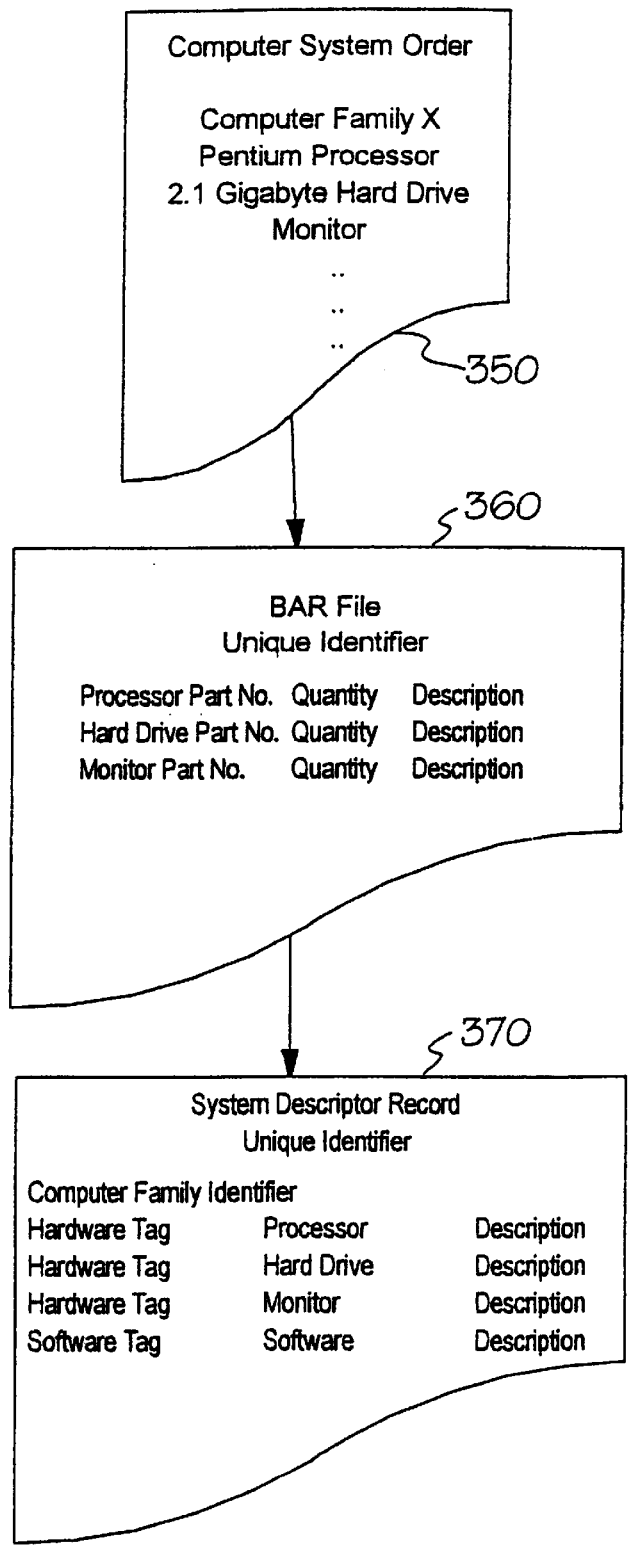
FIG. 3B illustrates an embodiment of a portion of an example computer order, Base Assembly Record (BAR) file, and system descriptor record.

FIG. 3B shows an example target computer system order 350, a corresponding BAR file 360, and a corresponding system descriptor record 370. Target computer system order 350 contains the name of a computer family, in this illustration, family "X". Also included in target computer system order 350 are three exemplary hardware components including a Pentium® processor, a hard drive, and a monitor. BAR file 360 results from running target computer system order 350 through a conversion program as depicted in module 320 of FIG. 3A. BAR file 360 contains a unique identifier for the specific target computer system within family X. BAR file 360 also includes the manufacturer-specific part numbers for each of the components listed in the target computer system order. Further, BAR file 360 contains an identifier indicating the quantity desired of each component as well as a text description of each component to be included on the target computer system. System 90 uses BAR file 360 to create system descriptor record 370.

As illustrated, the system descriptor record 370 also contains the unique identifier for the specific target computer system within family X. Moreover, the system descriptor record 370 contains appropriate tags, here indicating that the processor, hard drive and monitor are all hardware, rather than software, components. The system descriptor record 370 describes those components in a text description. Additionally, the exemplative system descriptor record 370 contains a software tag indicating that certain software should be installed or tested on the target computer system belonging to family X. For example, the software tag might indicate that a certain operating system appropriate for the Pentium® processor always be installed onto the hard drive of the target computer system belonging to family X.

Figure 4:
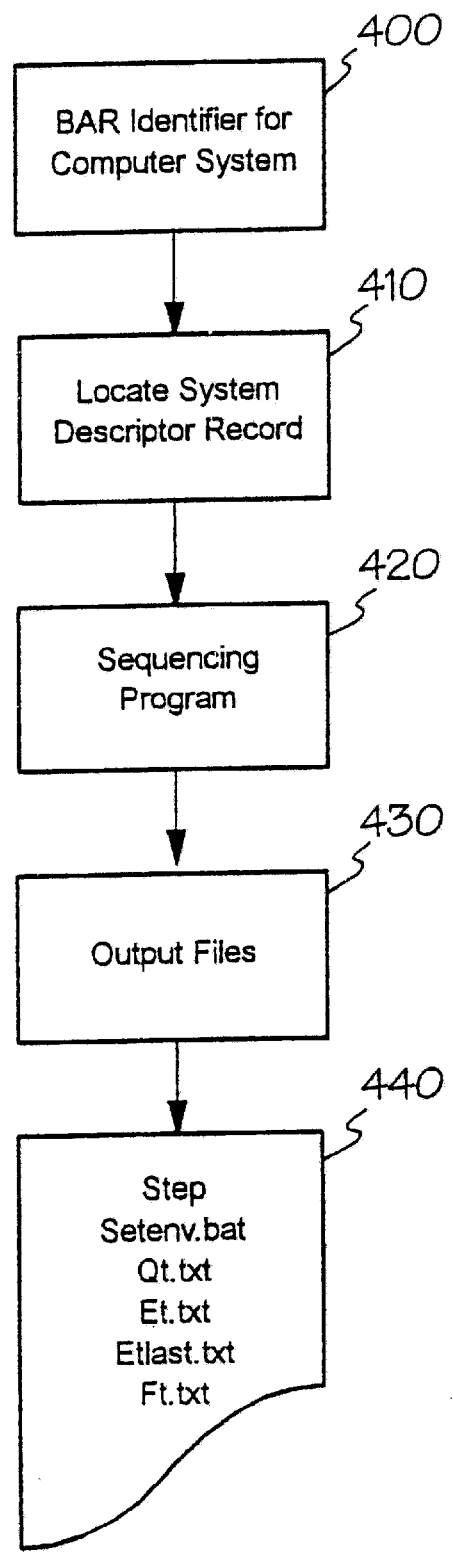
FIG. 4 is a flowchart illustrating an embodiment for creating and providing a step sequence.

In FIG. 4, the preferred general method for sequencing software installation and testing steps is set forth. In module 400, the unique identifier of the target computer system is generated for the target computer system 160. In the embodiment depicted in FIG. 1, a user sitting at step maker computer system 140 provides the unique identifier (e.g., the BAR identifier which functions as a tracking code) into sequencing program 204 of step maker 140. Alternatively, in the embodiment of FIG. 2, the unique identifier is automatically read into sequencing program 204 after the target computer system order is received.

In module 410, a system descriptor record corresponding to the BAR identifier is located. In the embodiment of FIG. 1, either network connection 110 or network connection 195 locates the system descriptor record. In the embodiment of FIG. 2, network connection 195 locates the system descriptor record. In module 420, the located system descriptor record is provided to sequencing program 204. In the FIG. 1 embodiment, the sequencing program resides on step maker computer system 140 while in the FIG. 2 embodiment, the sequencing program resides upon file server 202. Sequencing program 204 works in conjunction with database 100 (of FIGS. 1 and 2) to sequence software installation and testing steps for target computer system 160. Once the software installation and testing steps appropriate for the particular target computer systems are sequenced, sequencing program 204 produces output files as depicted in module 430.

In the embodiment depicted in FIG. 1, the output files are preferably written to step disk 150 (see FIG. 1) in six separate files. Those files include (1) a step file, (2) a Setenv.bat file, (3) a Qt.txt file, (4) an Et.txt file, (5) an Etlast.txt, and (6) an Ft.txt file. It is desired that the step file be an ASCII text file including a list of appropriate command lines for executing the software installation and testing steps for the target computer system being ordered. In a preferred embodiment, the step file also includes commands which may be looped. More specifically, the step file allows commands to be repeated for a defined number or iterations of for a defined length of time. Such a format advantageously allows for software installation or testing steps to be repeated in a calculated, predetermined manner. The Setenv.bat file preferably sets environment variables on the target computer system. It will be appreciated that in a mode of operation, only the Step file and the Setenv.bat file are necessary for installation and testing. The Step file and the Setenv.bat file are ASCII text script files containing a list of appropriate command lines for executing the installation and testing steps for the target computer system. The Qt.txt, Et.txt, Etlast.txt, and Ft.txt files are preferably all ASCII text files containing a list of appropriate command lines for running diagnostics in the Quick Test (Qt), Extended Test1 (ET1), Extended Test2 (ET2), Software Install (SI) and Final Test (Ft) phase of manufacture of the target computer system.

In the embodiment of FIG. 2, on the other hand, output files are not written to a step disk as depicted in FIG. 1.

Instead, the output files reside upon file server 202 or file server 190, where they are used to direct the execution of the software installation and/or testing steps upon target computer system 160.

Figure 5A:
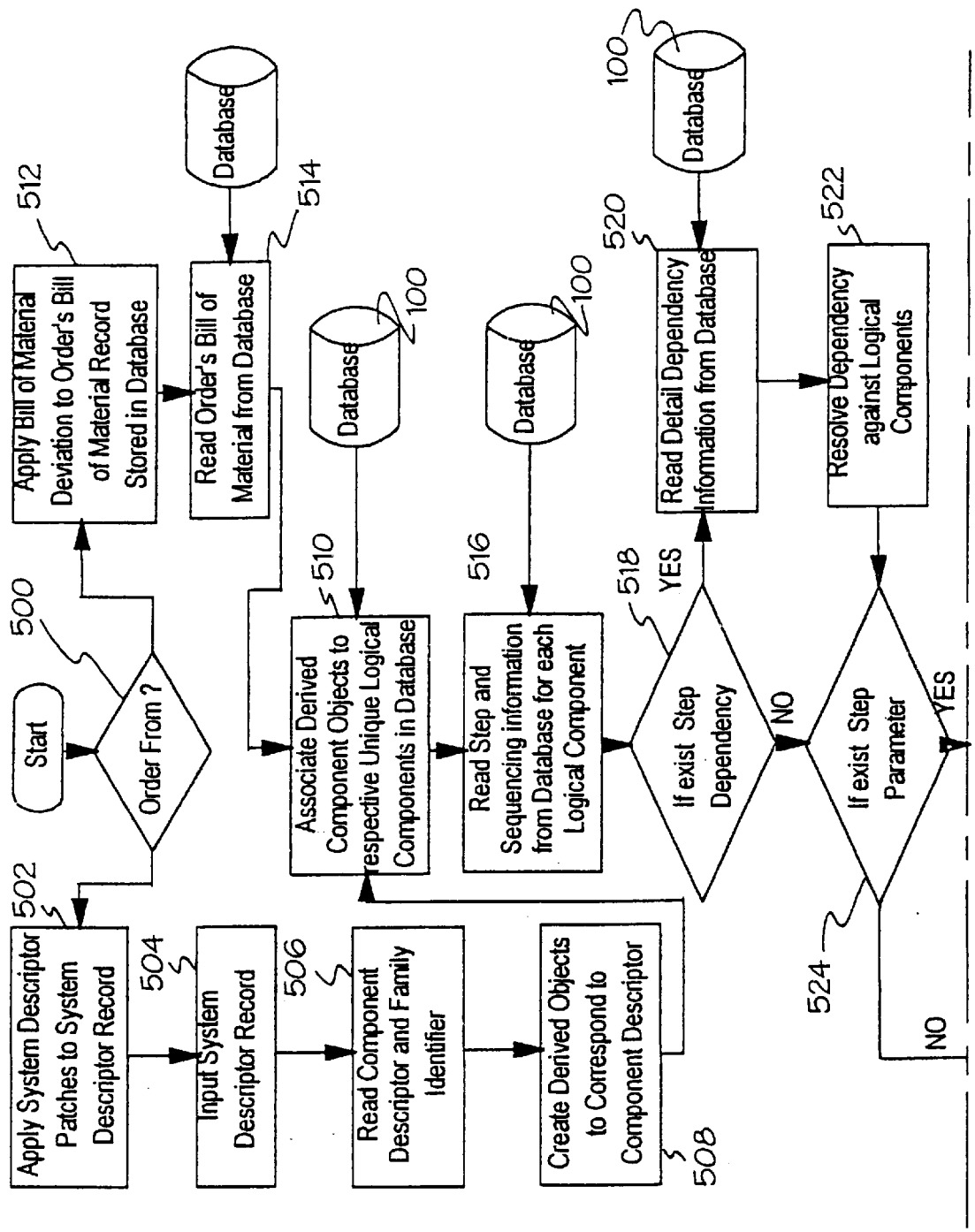
FIGS. 5A and 5B are a more detailed flowchart illustrating an embodiment for creating a step sequence.
Figure 5B:
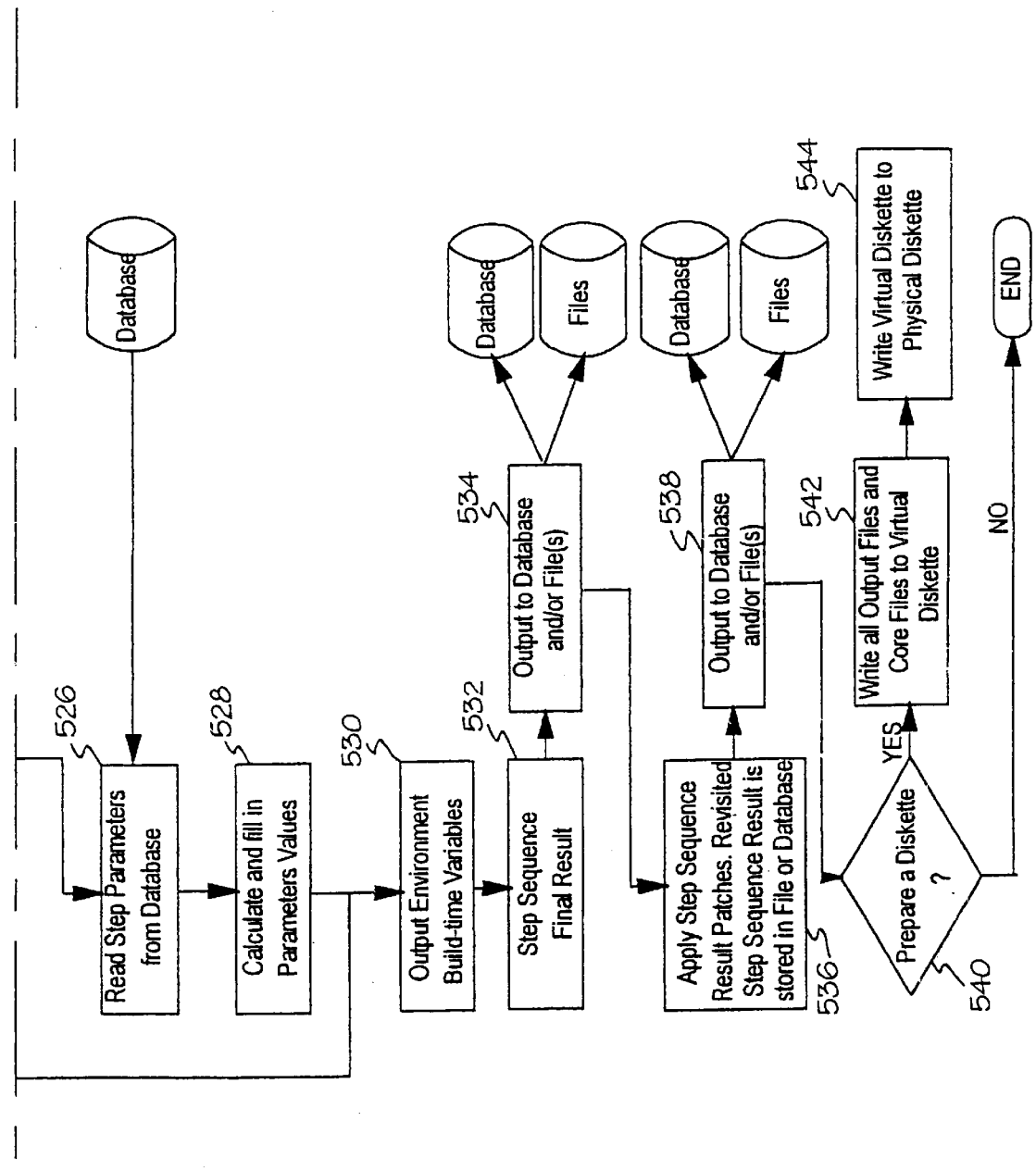

FIGS. 5A and 5B depict a more detailed schematic of the operation of sequencing program 204 depicted in FIGS. 1 and 2.

Decision module 500 determines the origin of an order. For the moment, just consider the left hand branch. If required, module 502 applies one or more patches to the system descriptor record. In the preferred embodiment, this patch is modular, allowing patches to be created for a specific target computer system, a particular family of computer systems, or for a particular component. For instance, if a manufacturer wished to substitute one brand of hard drives for another for a certain family of computer systems on a certain day, a patch may be formed which would modify all system descriptor records containing the hard drive to be substituted and make the substitution in module 502.

Then, module 504 inputs the (patched) system descriptor record corresponding to the target computer system 160 to the sequencing program 204. In module 506, a component descriptor is read from the system descriptor record. Each component descriptor describes a respective component, hardware or software, of the target computer system.

Turning to FIG. 3B, the line of the system descriptor record including the Pentium® processor in module 370 is an example component descriptor. In module 508, sequencing program 204 instantiates a plurality of derived objects corresponding respectively to the plurality of components of the target computer system 160. In the preferred embodiment, those derived objects are used to store information (obtained from database 100) about software installation and testing steps that need to be run on target computer system 160. Accordingly, in module 510 each derived object is associated with a respective component of the target computer system 160.

At this point refer to the right hand branch from module 500. In this case it is assumed that the order is directly stored by a customer as a record in a database in the form of a Bill of material, such record comprising component descriptors relating to the target computer system 160. Module 512, equivalent to module 502, applies deviations (patches) to the Bill of Material while module 514 reads the Bill of Material from the database on which it is stored for use by the sequencing program 204.

In module 516, software installation and testing steps associated with the respective components of target computer system 160 are retrieved from database 100 and stored in the appropriated derived object. In the embodiment of FIG. 1, the steps are retrieved via network connection 110, while in the FIG. 2 embodiment the steps are retrieved directly from file server 202. To describe how the steps are retrieved from database 100 in the preferred embodiment requires a description of the preferred construction of that database.

Figure 6:
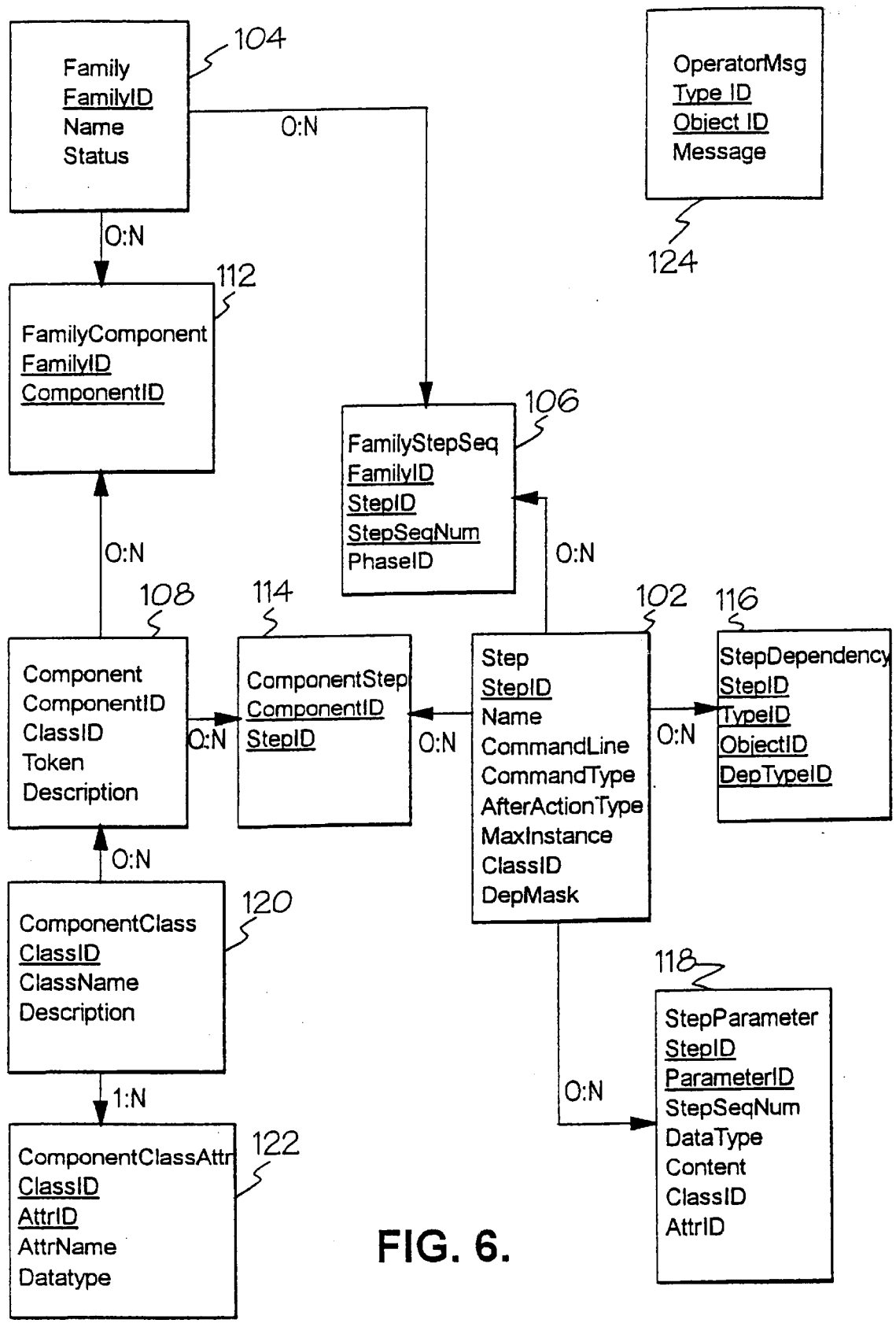
FIG. 6 is an illustration of an embodiment of a structure of a database.

FIG. 6 shows the design of database 100. Database 100 associates sequences of software installation and/or testing steps, in a predetermined order, with families of computer systems. Further, database 100 is configured to associate components of computer systems. Still further, database 100 associates software installation and/or testing steps with components of computer systems.

Database 100 is preferably a relational database. Database 100 contains several tables, each containing attributes suitable for creating the associations mentioned above.

Database 100 contains Step table 102, Family table 104, FamilyStepSeq table 106, Component table 108, Family-Component table 112, ComponentStep table 114, StepDependency table 116, StepParameter table 118, Component Class table 120, ComponentClassAttr table 122 and OperatorMsg table 124. In the preferred embodiment, each table contains a list of attributes, the underlined attributes serving as a primary key.

Step table 102 contains all software installation and testing steps for all possible components of all computer families. In the preferred construction, Step table 102 has attributes including StepID, Name, Command, CommandType, AfterActionType, MaxInstance, ClassID and DepMask. StepID is a unique identification number for each software installation or testing step. Name is a string assigning a name which is descriptive of the step. Command is a string assigning an executable command line for performing the software installation or testing step upon target system 160 (depicted in FIGS. 1 and 2). AfterAction Type is an identifier which determines if a halt or reboot (or other action) is needed afer the software installation or testing step is executed. MaxInstance is an identifier which indicates the maximum number of allowed times the step may run. ClassID identifies a certain type or class of component (e.g. hard drive, CD-ROM drive) which is associated with the software installation or testing step. Finally, DepMask records information as to whether or not a particular step has a step dependancy and/or a step parameter and therefore determines whether or not the StepDependency table 116 and/or StepParameter table 118 must be entered.

Family table 104 identifies each family of computer systems with an identification integer specified in attribute FamilyID. Also included in the Family table is a string identifying the name of the family.

FamilyStepSeq table 106 is a relational table which contains relations between Step table 102 Family table 104. FamilyStepSeq table 106 includes a family identification integer specified in attribute FamilyID for a particular family of computer systems (from Family table 104), a step identification integer specified in attribute StepID (from Step table 102) identifying a particular set of steps appropriate for that family, and a sequence number. The sequence number is contained within the attribute StepSeqNum which represents a predetermined order in which steps associated with a particular family are to be run. Test engineers assign the sequence numbers, unique within each phase of manufacture, in an order chosen to be the most effective for a particular target system. It will be appreciated that other ways of assigning sequence numbers may be used. Finally, FamilyStepSeq table 106 includes PhaseID from Step table 102.

Component table 108 contains all possible components that are included within computer systems being manufactured. Attributes of this table are ComponentID which assigns an identifier to each component, Description which assigns a string name to each component, and ClassId which references the type of component (e.g., hard drive, CD-ROM drive).

FamilyComponent table 112 is a relational table containing relations between each family of computer systems and a set of components that can be included in that family. The attributes of FamilyComponent table 112 include a computer family identification integer specified in attribute FamilyID (from Family table 104) and a component identification integer specified in attribute ComponentID (from Component table 108).

ComponentStep table 114 is a relational table containing relations between each component and a set of software installation and testing steps appropriate for that component. The attributes of ComponentStep table 114 include a component identification integer specified in attribute ComponentID (from Component table 108) and a step identification integer specified in attribute StepID (from Step table 102).

StepDependency table 116 contains data concerning possible conflicts. Certain tests may conflict with certain classes of components, or specific components themselves, or components from certain manufacturers. For example, the target computer system 160 to be built may comprise a brand A hard drive and a brand B CD-Rom. A brand A hard drive may ordinarily require that test C is run but it may be that test C is incompatible with CD-ROM drive B; all such dependencies re recorded in the StepDependency table 116. In this table, StepID identifies the step having a dependency, TypeID indicates whether or not the dependency is in respect of a class of component or a specific component, ObjectiD is either a class ID or a component ID depending on the status of TypeID, and DepTypeID indicates whether or not a particular step should be kept in or removed as and when a conflict arises.

The StepParameter table 118 identifies parameters which certain steps may require; for example, a step may be required to run for a specific length of time, or to run through a specific number of iterations. In table 118, StepID uniquely identifies the particular installation or testing step. ParameterID identifies each parameter associated with that step; there may be more than one parameter associated with a particular step and each will have its own ParameterID. For example, the same test, but with different parameters, may be used for different brands of hard drive. DataType identifies the type of data which is to be included in the respective parameter. In the above example, the DataType may specify that the data is to a percentage or, alternatively, a hard drive ID code. Content is a command line switch as used in the C programming language in association with a command like "printf". For example, Content may be "-%d" to indicate that a numeric value is appropriate for this parameter. StepSeqNum and ClassID are as described above.

It is to be noted that the StepParameter table 118 stores only the nature and number of parameters associated with a particular step, but does not actually store the values of those parameters. Thus, during construction of a step file, to be described, the table 118 does not insert parameter values into a command line of the step file. Rather, it contains all details necessary to enable the command line to be constructed. It is the sequencing program 204 which calculates the value of the parameter and inserts the same into the step file command line during execution. The sequencing program performs the calculation on the basis of information which is contained in the descriptor record.

The advantage in having StepParameter table 118 is to allow greater flexibility by avoiding the need to have parameters permanently associated with steps. Thus the table 118 allows an engineer to readily modify the parameters without having to edit the Step table 102.

The ComponentClass table 120 is simply a list of all classes of components (ClassID), e.g. hard drive, CD ROM, etc., together with a brief description of those classes (ClassName, Description).

The ComponentClassAttr table 122 lists all the classes and all the attributes associated with each class. AttrID is a code assigned to each different type of attribute such as memory size, operating speed, manufacturer, etc., while AttrName is a more descriptive name of the attribute for the benefit of an engineer. DataType is an indication of the type of data which is used to represent a particular attribute. For example, it may be a character string in the case where the attribute is the manufacturer's name, or it may be an integer if the attribute is a memory size.

The ComponentClass table 120 and ComponentClassAttr table 122 are not actively used by the sequencing program 204, but are primarily used by development engineers. These tables do not include any actual values of the attributes.

Finally, the OperatorMsg table 124 stores a number of messages for the test operator depending on the test being carried out and the components being tested. For example, a prompt may issue to remind an operator to put a tape into a tape drive before testing the tape drive.

The example target computer system depicted in FIG. 3B will be used to illustrate how the above-outline database design is used to retrieve software installation and testing steps. The computer family identifier in the system descriptor record identifying family X is associated with the FamilyID corresponding to the family X in family table 104. Component table 108 is used to check if the components of the target computer system listed in the target computer system order are legal. In other words, the sequencing program and database determine if the processor, hard drive, monitor, and software contained in the system descriptor record of FIG. 3B have corresponding entries and corresponding integers specified by ComponentID in Component table 108. If a component is not legal (i.e. if a component in the system descriptor record is not contained in Component table 108), an error flag is raised. The FamilyComponent table 112 is a relational table which contains mappings from the Component table 108 and the Family table 104. The FamilyComponent table 112 contains all the legal components which may be included on a target computer system belonging to family X. Thus, the FamilyComponent table 112 may be used to check if all the components of the target system are legal. In other words, the sequencing program and database determine if the processor, hard drive, monitor, and software contained in the system descriptor record of FIG. 3B have corresponding relations in the FamilyComponent table 112. If a component is not legal (i.e. if a component in the system descriptor record may not be included on a target system belonging to family X), an error flag is raised.

In the relational FamilyStepSeq table 106 resides mappings from Step table 102 and Family table 104. The FamilyStepSeq table 106 contains all the software installation and testing steps which may legally be run on target computer systems belonging to family X. Furthermore, it is in this FamilyStepSeq table 106 that sequence and phase numbers are associated with each software installation and testing step. Those sequence and phase numbers represent the proper order in which steps should be run for a particular family of computer systems. Therefore, the FamilyStepSeq table 106 contains a listing of steps to be run on family X target computer systems as well as sequence and phase numbers representing a predetermined order in which the steps should be executed.

The ComponentStep table 114 is a relational table which contains mappings from the Component table 108 and the Step table 102. The ComponentStep table 114 contains the software installation and testing steps to be run for the processor, hard drive, monitor, and software of the target computer system.

To retrieve software installation and testing steps associated with the respective components to be included on the target system involves performing a join operation on the FamilyComponent table 112 and the ComponentStep table 114 to obtain an intermediate set listing steps to be run on the components of target computer system 160.

The join operation results in a list of steps to be run on the processor, hard drive, monitor, and software listed in the system descriptor record depicted in FIG. 3B. The result of the joinder of the FamilyComponent table 112 and the ComponentStep table 114 is then joined with the FamilyStepSeq table 106 which contains all the steps for family X. The result of this join operation includes sequencing information in the form of sequence numbers and phase numbers, the sequence numbers being unique within a particular phase. Thus, a three-table join of FamilyComponent table 114, and FamilyStepSeq table 106 yields the appropriate software installation and testing steps as well as sequencing information in the form of sequence and phase numbers to install and/or test software upon target computer system 160.

If the result of the first join operation (the join of FamilyComponent table 112 and ComponentStep table 114) is an empty set, an error condition is be raised, for an empty set signals that a component to be included on the target system does not belong in the family listed on the system descriptor record. An example of this is illustrative. Consider that a system descriptor record correctly indicates that a target computer system belongs to family Y. Assume, however, that system descriptor record incorrectly indicates that a hard drive (hard drive Z) belonging only to target systems in family X should be included on the target system which is in family Y. In that case, ComponentStep table 114 contains steps associated with hard drive Z. FamilyComponent table 112 contains components associated with family Y. Thus, joining ComponentStep table 114 with FamilyComponent table 112 produces an empty set, for hard drive Z is not a component associated with family Y (instead, it is only associated with family X). As apparent from the above example, the preferred design of the database advantageously allows one to make certain that a target system of certain family contains only components appropriate for that family.

Referring again to FIG. 5, after the steps associated with the components to be included in the target system are retrieved, module 518 of sequencing program 204 determines, for each step, whether there is a step dependency by examining DepMask for that step. If so, module 520 reads the dependency from the StepDependency table 116 and module 522 resolves the dependency according to DepTypeID.

Next, module 524 determines if the step requires a parameter, again by examining DepMask for that step. If so, module 526 reads the parameter data from StepParameter table 118 and module 528 calculates the actual value of the parameter and inserts it into the command line of the step.

Now, module 530 prepares environment variables for the target computer system by reading the system descriptor record and creating a environment file corresponding to the components to be included on the target system. For example, the system descriptor record depicted in FIG. 3B is read, and an environment variable such as "set cpu=pentium" might be prepared corresponding to the processor hardware component of the system descriptor record.

In module 532, the plurality of retrieved software installation and testing steps, retrieved by the three-table join described above and with dependencies resolved and parameters added, are sequenced in the predetermined order. This sequencing is in accordance with the respective sequence numbers and phase numbers to provide a step sequence. The sequencing itself be accomplished using any of many sorting algorithms well-known in the art.

In module 534, the sequencing program 204 outputs files. Those files include (1) a step file, (2) a Setenv.bat file, (3) a Qt.txt file, (4) an Et.txt file, (5) an Etlast.txt and (6) an Ft.txt file. It is desired that the step file be an ASCII text file. In a preferred embodiment, the step file also includes commands which may be looped. More specifically, the step file allows commands to be repeated for a defined number or iterations or for a defined length of time. The Setenv.bat file sets the environment variables on the target computer system. The step file contains the steps to be executed respectively during the Quick Test (Qt), Extended Test1 (ET1), Extended Test2 (ET2), Software Install (SI) and Final Test (Ft) phases of manufacture of the target computer system.

As shown, for the FIG. 2 embodiment module 534 stores the output files, as such or in a database, on file server 202. The output files written to file server 202 can be used to direct the execution of the software installation and testing steps upon target computer system 160.

In module 536, the step sequence is, if required, modified using a step sequence patch. In the preferred embodiment, this patch is modular, allowing patches to be created for a specific target computer system, a particular family of computer systems or for a particular component. For instance, if a manufacturer wished to run one testing step before another for a certain component on a certain day, a patch may be formed which would modify all step sequences containing the steps whose order is to be modified and correspondingly change the execution order in module 536. Following patching, module 538 outputs revised files for storage, again as such or in a database, on file server 202.

Finally, module 540 gives the option of writing to a diskette 150, FIG. 1. If a diskette is required, instead of writing directly to the diskette, module 542 creates a "virtual diskette" in memory and then module 544 writes the entire virtual diskette to the physical diskette in one operation this reduces the number of write operations to a floppy disk drive and therefore significantly speeds up the overall operation of the program.

The virtual diskette is created by the following program which creates a memory equivalent of the physical diskette by allocating an array of memory blocks each equivalent to the size of a physical sector size on the physical diskette. The file system is FAT12 (used by PC-DOS, MS-DOS, Windows 95 and Windows NT operating systems). The first sector is the boot sector of the diskette. A cluster is a logical grouping/unit of a set of sectors. This number is fixed once a file systems is initialized. For example, a cluster size is 2 sectors. File system allows only allocation by cluster not by sector. In this case, the smallest file will at least consume 1 cluster (or 2 sectors).

Start

Create an array of memory block. Number of memory block equivalent to the number of physical sector on the diskette with the given file system.

Initialize all memory block content to zeros.

Initialize boot sector by copying an external image of the boot sector only. This external image is stored in a file.

Initialize the FAT tables. (Well defined sectors on the diskette by the file system).

If file write operation is requested.

Read the file.
Allocate Clusters needed.
　If error, exist function with error because there is not enough space.
Update the directory and FAT table for clusters allocated.
Write the content read to the clusters.
If file delete operation is requested.
Free allocate clusters for the given file.
Update the directory and FAT table for clusters freed.
If physical diskette write operation is requested.
Get diskette usage count stored at the fourth byte of the boot sector from the diskette.
If the count is >=the maximum count, return error code to indicate the error reason.
If count is < the maximum count, increment the count by 1.
Write the count value back to the third byte of the boot sector on virtual diskette.
Write memory blocks from virtual diskette to physical diskette, stop when no more memory block that contains data is left.
End.

Turning again to FIGS. 1 and 2, arrow 130 depicts that modifications may be made to database 100. For instance, if a new family of computer systems is created, one may modify database 100 accordingly. More specifically, the new family is assigned a new family identifier in FamilyID of Family table 104 and a name for the new family is assigned to the Name attribute of Family table 104. A list of software installation steps and testing steps is added to FamilyStepSeq table 106, these steps representing which steps need be run, and in what predetermined order, upon the new computer system family. If the new family of computer systems shares several similarities with an existing family, it is likely that entries for the existing family in FamilyStepSeq table 106 may be modified to produce entries for the new family. If any new steps need be created for the new family of computer systems, these steps are added to Step table 102. Similarly, if any new components accompany the new family of computer systems, these steps are added to Component table 108. ComponentStep table 114 is updated to associates each component of the new family of computer systems with the steps appropriate for its software installation and testing. If the new family uses only components already present in the database, this table need not be modified. FamilyComponent table 112 is updated so that a list of allowed components which may be included on the new family would be in the database. Particularly, one would need to associate the SysID of the new computer system with the CompID of each allowed component. Again, this could may be done by copying and then modifying an existing entry of an older family of computer systems.

It shall be appreciated that in constructing a database accordingly to the preferred embodiment, certain significant advantages are provided. In particular, the modular design of the database advantageously allows for easy setup of software installation and testing steps for new families of computer systems. Additionally, software installation and testing steps for a particular family of computer systems or for a particular component may be modified independent of other software installation and testing steps.

Attention will now be turned on executing the step sequence on target system 160. Software installation and testing steps are executed upon target computer system 160 using a program which reads, interprets, and executes the step sequence corresponding to the target computer system. In the preferred embodiment, this program is called Runstep and is located on step disk 150 in the embodiment of FIG. 1 and on file server 202 in the embodiment of FIG. 2.

Figure 7:
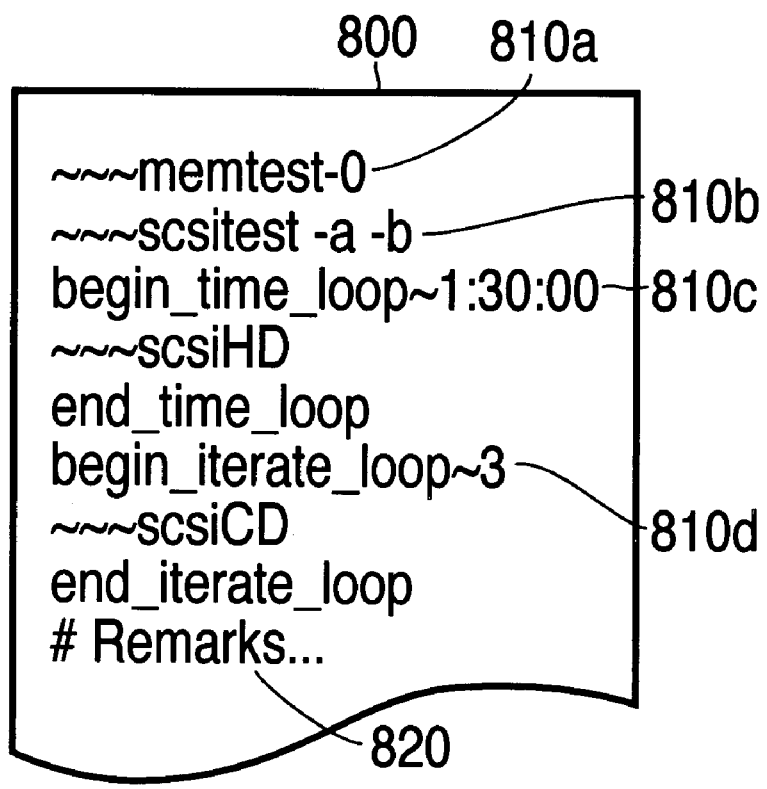
FIG. 7 is an example illustrating an embodiment of part of a step file.

FIG. 7 depicts a portion of a step sequence contained in a step file before any software installation and testing steps have been executed. As mentioned earlier, the step sequence includes commands for installing software and/or for testing the build-to-order target computer system. Additionally, the step sequence in the step file allows commands to be repeated for a defined number of iterations or for a defined length of time. Further, the step file may contain remarks, ignored by the Runstep program. In the step file, marks 800 are used to separate fields of the step sequence. Items 810 are commands for testing target computer system 160. The commands include, for example, a command for testing memory and for testing small computer system interface (SCSI) devices. As can be seen from the figure, each command may include switches such as '-o' appropriate for the particular testing environment. Item 820 is a remark which is ignored by the Runstep program. Item 810c is a command which is looped by time. In the preferred construction, the 'begin_time_loop' instruction designates the starting point of a loop. The 'end_time_loop' instruction is combined with a field designating the length of time to iterate through the loop. Here, for example, command 810c is run for one hour and thirty minutes. Item 810d is a command which is looped according to number of iterations. In the preferred embodiment, the 'begin_iterate_loop' command instructs the Runstep program that an iterative loop is to be performed. The 'end_iterate_loop' command signals the end of the looping commands. Here, command 810d is run three times.

FIGS. 8 to 13 illustrate the flowchart for the RunStep program. As an overview, RunStep program. As an overview, RunStep processes the step file one line at a time rather than reading the entire step file one line at a time rather than reading the entire step file into memory. At each line RunStep performs a number of checks to assess whether or not it should continue processing that line. For example, if RunStep sees that a failure condition has been registered since the previous line was executed, then it knows there is no point in continuing with the program. Alternatively, RunStep can check to see whether or not an operator has tampered with the step file (in order to miss out a tedious test for example) and if so will not continue with the program thereby forcing the operator to start all over again. Thus, a particular line of a step file is only read if RunStep determines that that line is going to be executed—there is therefore no unnecessary reading of lines from the step file. Clearly, this is a time saving feature.

Figure 8:
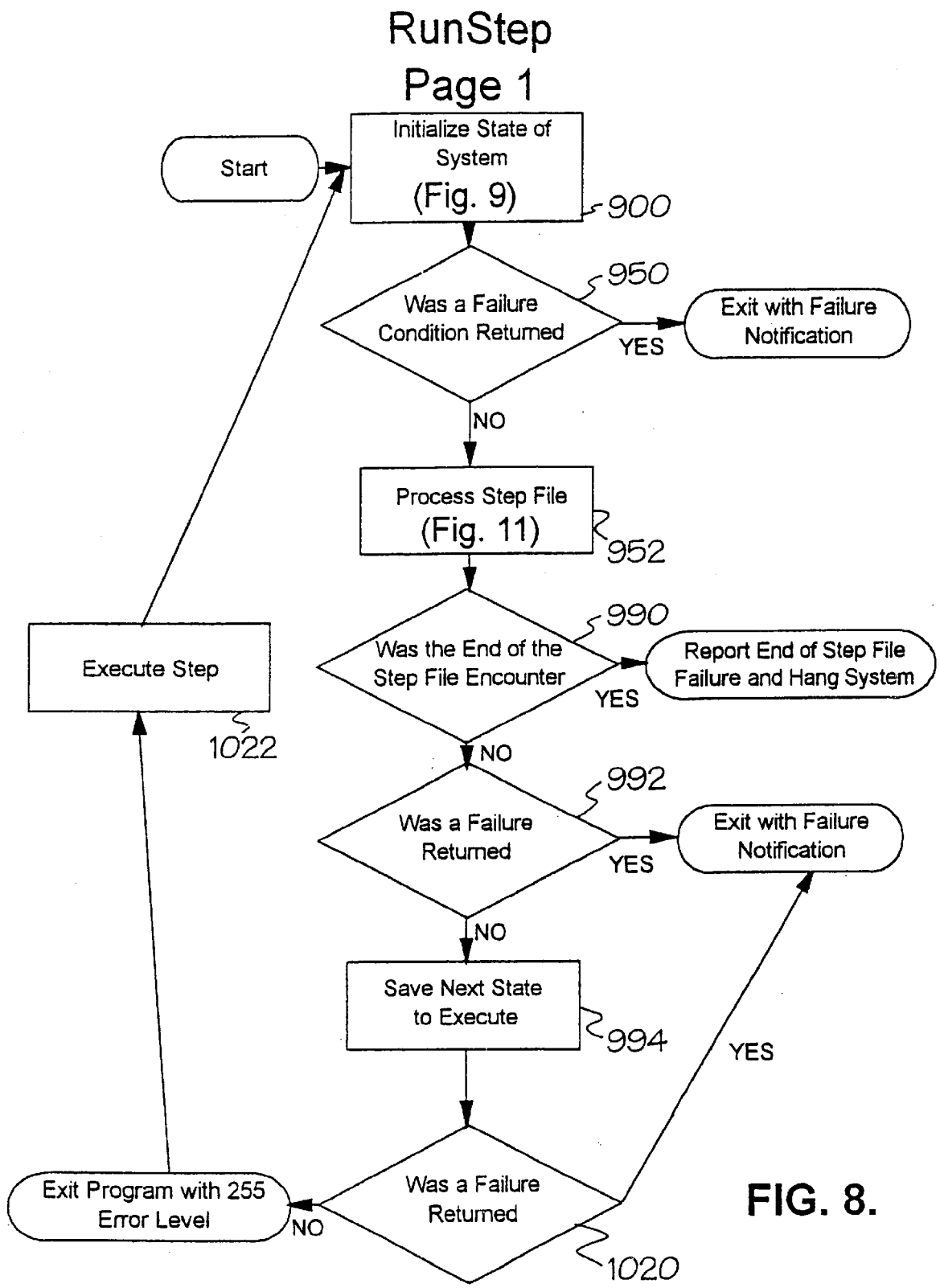
FIGS. 8 to 13 are flowcharts illustrating an embodiment of the operation of a program for executing a step sequence.

FIG. 8 is the top level flow chart of RunStep. The first module 900 initializes the state of the system. This is performed before any line of a step file is read. During this stage, RunStep reads the various environment variables (from a file "progress.bat", to be described) so that it knows the precise state of the system, e.g. was a failure returned in executing the last line? Must a re-run be performed, or can RunStep proceed with reading the next line?

Figure 9:
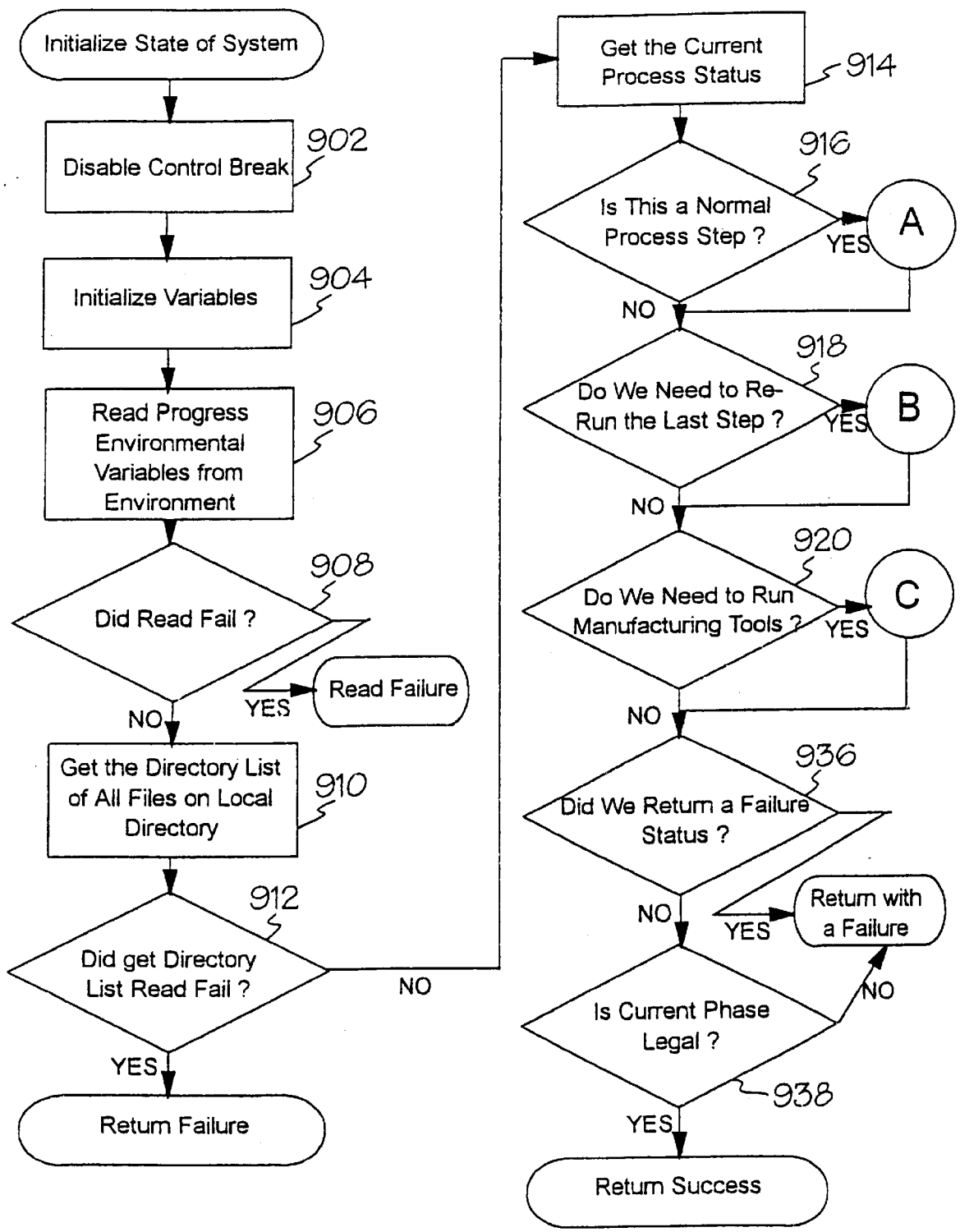

FIG. 9 describes the initialization stage in more detail. The first module 902 disables control break—this prevents an operator from breaking out of the program to bypass a step. Variables are then initialized, module 904, and the program reads the environmental variables from the environment, module 906. These environmental variables are mainly stored in a batch file called progress. bat which is held in memory and which RunStep will have written to when it was executing earlier lines in the step file. Progress-.bat contains the current system status and, as will be described (module 106, FIG. 13), is updated for each line read from the step file. The environmental variables will include information such as the line number of the last step executed, how much time has expired if a particular command is being executed within the time loop; which test phase is being performed.

If the environmental variable s are read successfully, as determined by module 908, then module 910 reads the directory list of all files on the local drive into the memory of the computer 160 or 202 on which RunStep is running. Thus when RunStep comes to check whether or not a file is on the local drive (module 1002, FIG. 13) it can do this by reading through the directory list in memory and does not have to search through the local drive itself. This saves time.

If RunStep is successful is reading the directory list, as determined by module 912, then module 914 gets the current process status. During this stage, RunStep sets a number of flags in accordance with the status of the system i.e. failure, re-run etc. It is these flags which will determine the flow of RunStep through the subsequent modules 916, 918, 920. These modules will direct RunStep into sub-routines A, B or C, FIG. 10, as applicable.

Figure 10:
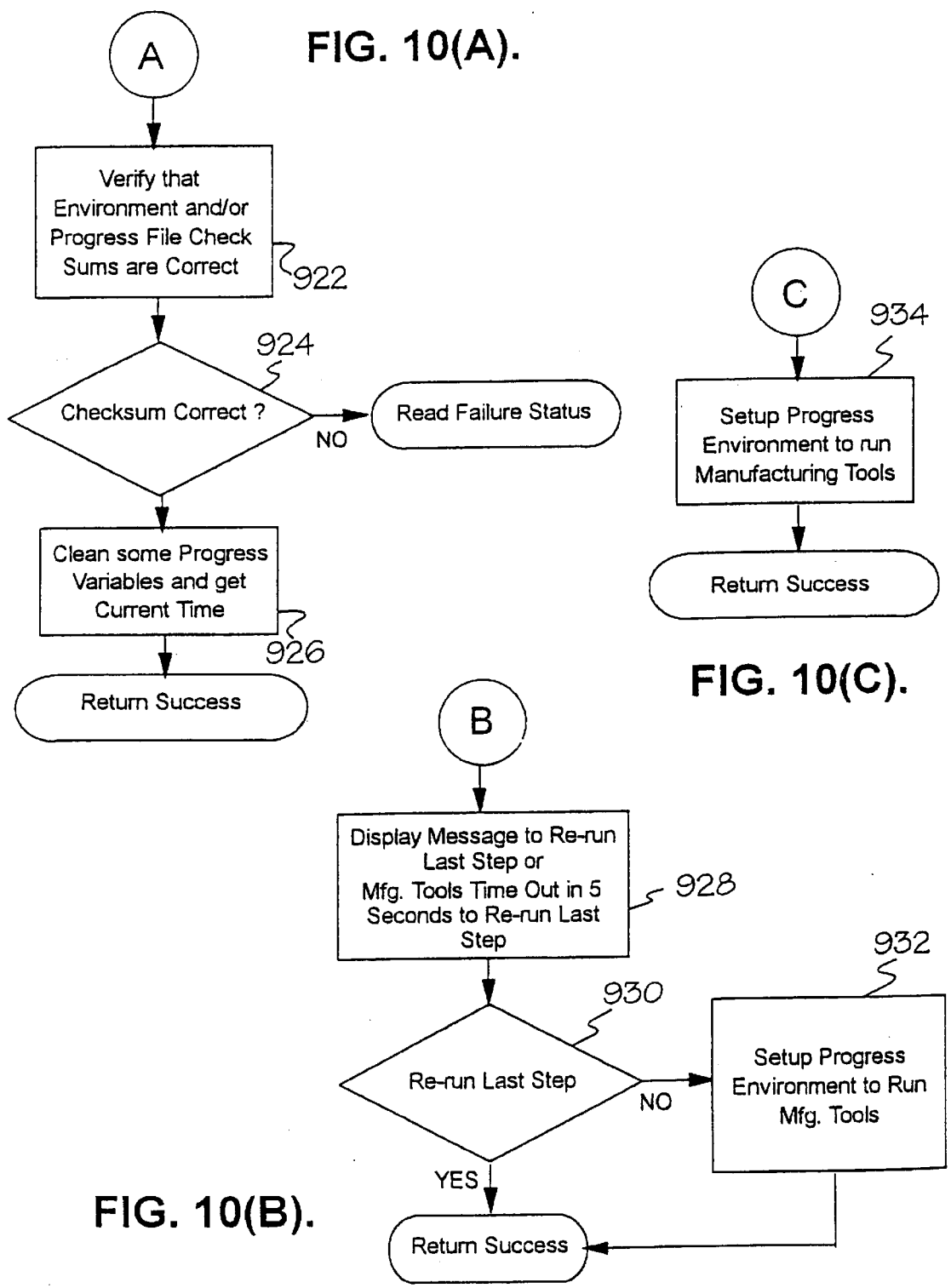

Referring to FIG. 10(*a*), routine A is entered if RunStep has established at module 916 that the next step is a normal process step. The first module in routine A, module 922, verifies various checksums. The purpose of this is to ensure that there has been no tampering with the step file, e.g. RunStep reads certain checksums and correlates them with checksums which are stored in progress.bat—any discrepancies would indicate that an unauthorized person had been modifying the step file. If all the check sums are correct, as determined by module 924, then the program resets (cleans up) certain variables and reads the current time, module 926.

Routine B, FIG. 10(*b*), is entered if the environment indicates that the last step needs to be re-run, as determined by module 918. The purpose of routine B is to give an authorized operator an opportunity to break into the program to avoid re-running the last step if desired. Hence at module 928 a message is displayed that the operator may select Manufacturing Tools (MFGTools) within five seconds or else the re-run will proceed. Manufacturing Tools is an approved method whereby an authorized operator with the appropriate password can break into the step file and modify it as desired. Module 930 determines if the last step is to be re-run, depending upon the operator response, and if so module 932 sets the progress environment (progress.bat) to run MFGTools.

Routine C, FIG. 10(*c*), simply sets the progress environment (progress.bat) to run MFGTools, module 934.

Returning to FIG. 9, module 936 determines if a failure was returned, and if not, module 938 checks to see if the current phase is legal.

Referring back to FIG. 8, once the initialization module 900 is completed, and if "success" was returned as determined by module 950, then RunStep proceeds to module 952, which is "process step file". By the time RunStep has reached this stage, it has read enough information from the environment to know whether or not it should proceed with the next line of the step file, re-run the previous line, or abort.

Figure 11:
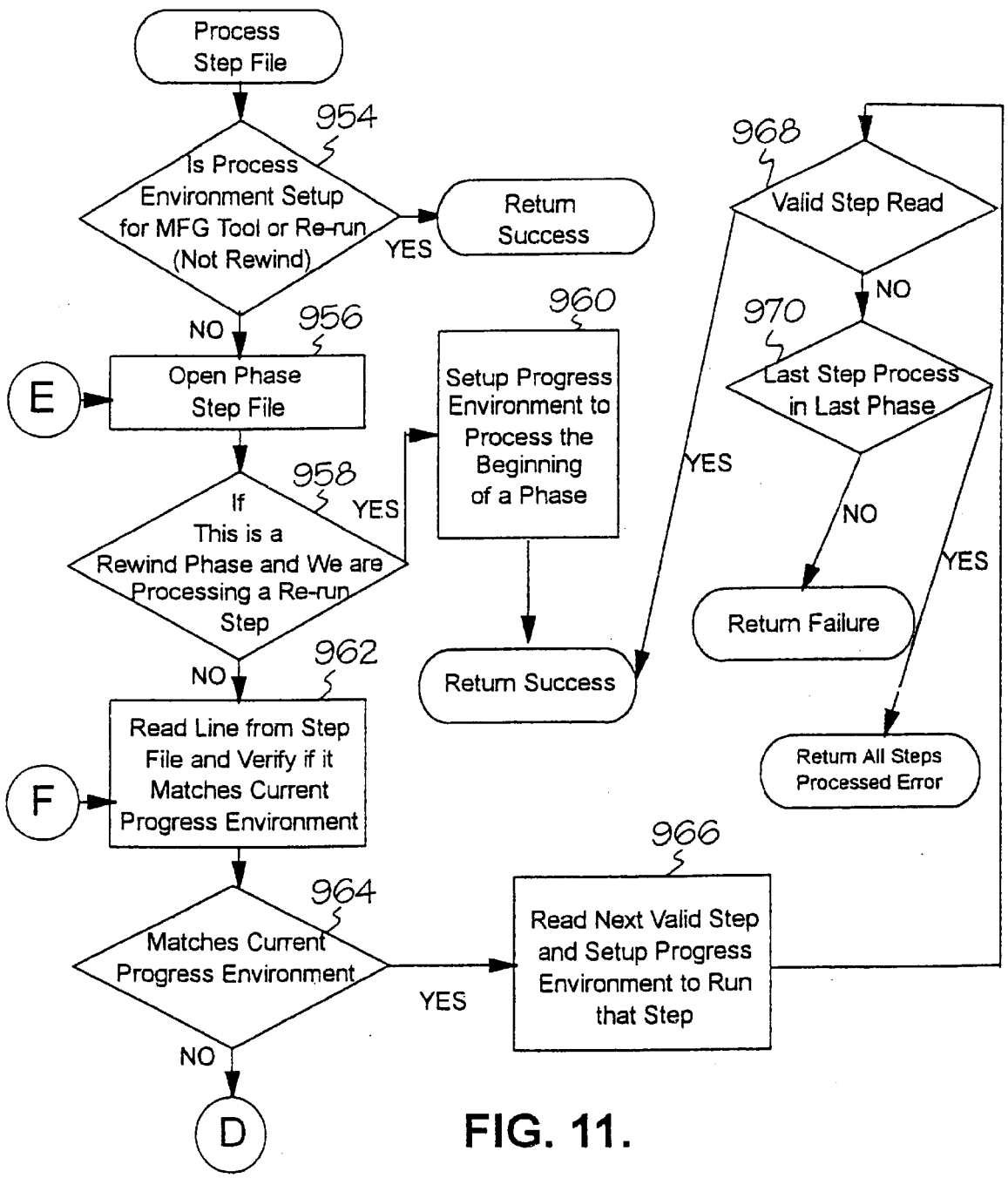

FIG. 11 shows the module 952, "process step file", in more detail. Module 954 establishes whether or not the Manufacturing Tools has been selected or a re-run is required. If either of these are true then no further setting up is necessary and this part of the program can return success.

If neither of these conditions are true (i.e. RunStep is supposed to now go onto the next line of the step file) then the appropriate phase step file is opened at module 956. This means that RunStep opens the step file associated with the particular phase of testing that is being conducted (i.e. quick test, extended test, etc.).

Module 958 establishes whether or not there is a rewind phase. A rewind phase is a special case of a re-run in which the entire phase of testing needs to be repeated in the event of a failure of one of these steps—i.e. RunStep must go backto the beginning of the step file for that phase. If RunStep establishes that it is a rewind phase, then module 960 sets up the environment accordingly and success is returned.

If it is a rewind phase, then module 962 reads the next line number from the step file and further checks that the line number that it has just read is the line that it is expecting to read by matching the line number against the one stored in progress.bat which RunStep read during the initialization stage—again this is a anti-tampering device. In particular, when RunStep is running, progress.bat will contain information concerning the last step which was executed, i.e. information such as the line number in the step file, the command ID of the command that was executed, and other checks and relevant information. At module 962 RunStep reads the progress.bat file, contained in memory, and skips down a specific number of lines of the step file as determined by the line number in progress.bat. it then checks whether or not the line number which it is actually at corresponds with the line number that it is expecting to be at. It also checks whether or not the command at this line is the same as the one it has been told has just been executed, i.e. RunStep validates that the line at which it now finds itself is actually the last step which was run.

If it is, as determined by module 964, then at module 966 RunStep reads the step and sets up the progress environment for running the next step. Module 968 check that the step read was valid and if so, returns success. If there was not a valid step read, RunStep checks at module 970 to see whether or not it has in fact reached the last line of the step file of the last phase—if so, then RunStep returns a message of "all steps processed" indicating that all testing is complete. If not, RunStep returns failure.

Figure 12:
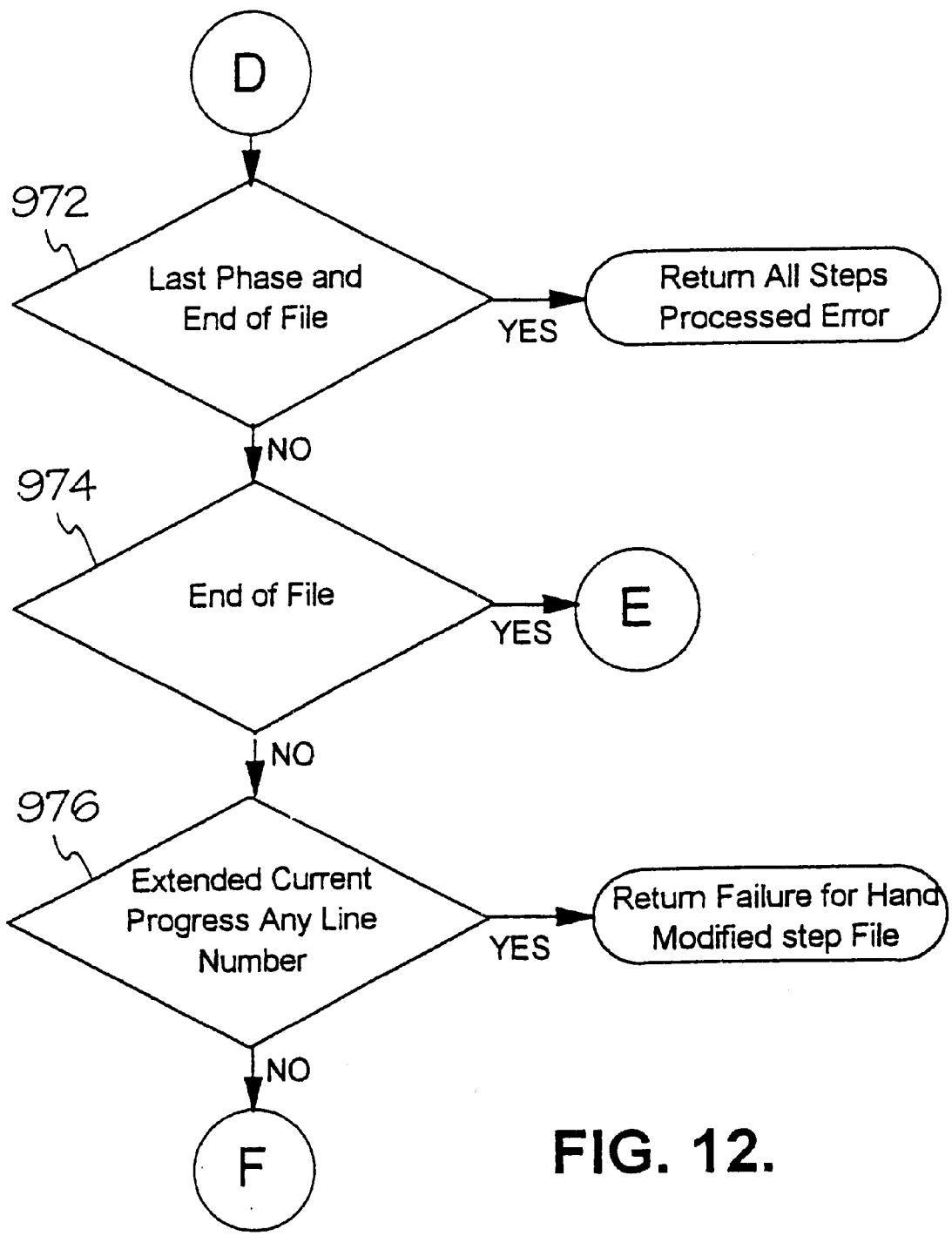
Figure 13:
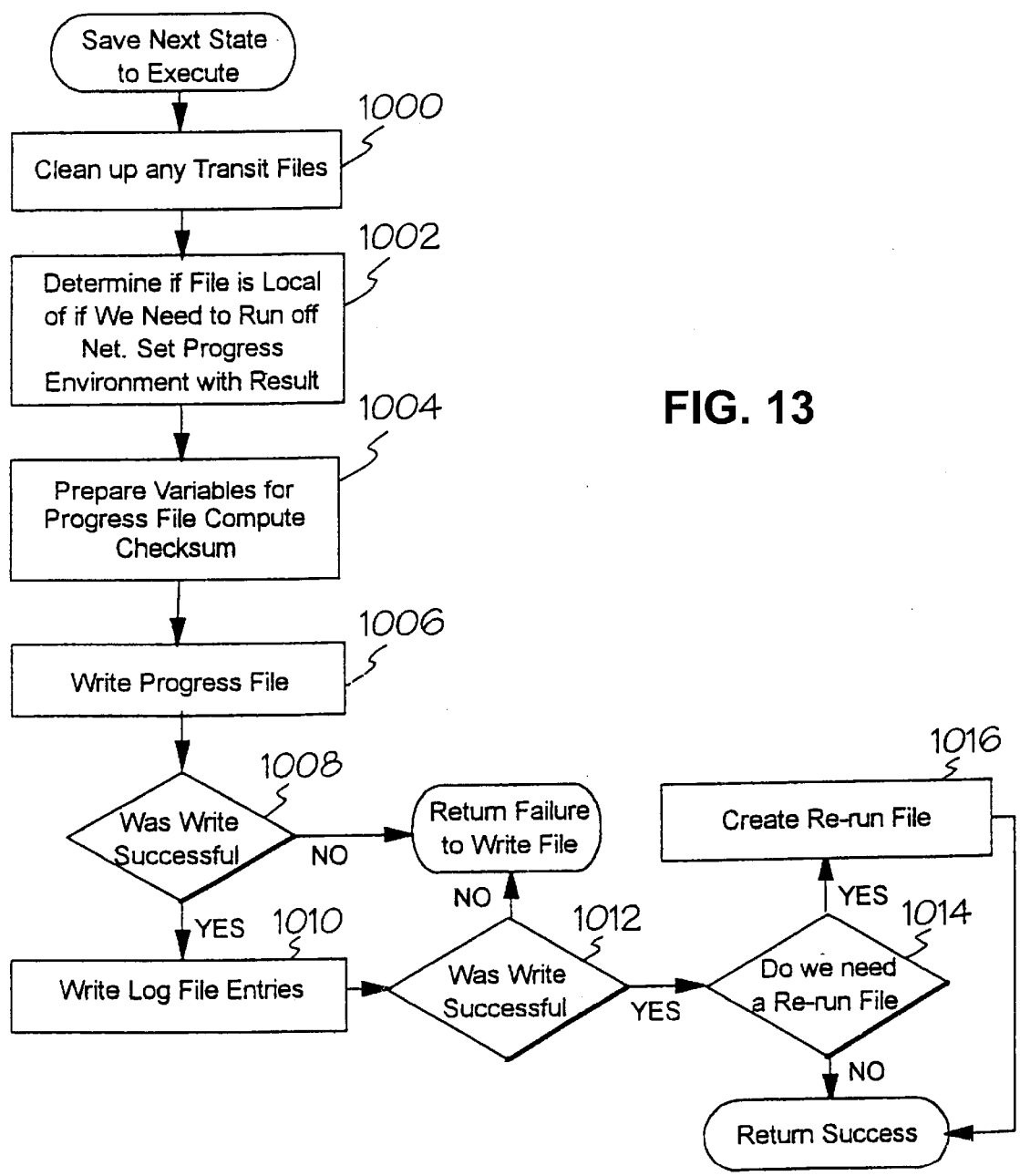

If, on the other hand, Module 964 of RunStep shows that the line number which it has just read does not match the line number which it is expecting then RunStep proceeds into the routine shown in FIG. 12. The first module 972 checks whether RunStep has in fact reached the last line of the step file for the last phase. If it has, then a message is returned indicating that all the testing is complete. If not, module 974 checks whether the last line is a step file has been reached. If so, then RunStep returns to module 956 and opens the step file for the next phase of testing.

If, on the other hand, RunStep establishes that it is not the end of the step file, then it checks at module 976 to see whether or not the line number which it has just read exceeds the line which it is expecting (from reading from memory).

If the line number is exceeded, this indicates to RunStep that there has been manual tampering of the step file (e.g. an operator has removed a step from the step file) and RunStep returns failure. If the line number is not exceeded, then RunStep returns to module 962.

RunStep then returns to module 990, FIG. 8, and if the end of the step file was encountered, it reports this to the operator. RunStep further checks whether or not failure was returned at module 992. If so, this is reported and RunStep is exited.

At this stage, RunStep has determined the precise status of the system, knows whether or not it is about to re-run a step, rewind a phase or execute the next line in the step file and has set up the memory accordingly. Before continuing, RunStep saves all the information it has learned at the previous stages. This is done at module 994 which is illustrated in more detail in FIG. 13.

First of all, module 1000 takes the opportunity to clean up any files which are no longer needed. Then, module 1002 determines whether or not the testing which is about to take place is to be run off a local drive or across a network, and saves this information. Next, modules 1004, 1006, RunStep uses the information that it has learned in the previous stages to set the environment variables (in progress.bat) so that the next time RunStep is executed from the beginning, all the environment variables have been updated to represent the current state of the system.

After checking at module 1008 that the write was successful, RunStep then writes a log file at module 1010. If this is successful, module 1012, the need for a re-run is determined at module 1014 and if one is needed module 1016 and creates a re-run file.

Control then returns to module 1020, FIG. 8, and, if no failure was returned, the program is exited with a 255 error level indicating that execution of the command line read from the step file at module 966 should take place. This occurs in module 1022. Then RunStep returns to the start to process the next step (line in the step file).

It will be seen that the RunStep program is a high security system in that there are various checks included to prevent an unauthorized operator from tampering with the step file in order to do away with tedious tests or avoid re-runs. This is achieved by disabling the control break; verifying the line numbers of the step file at various intervals; and putting check sums into the system. Another security aspect is that whenever a failure occurs, as determined by RunStep at various points in the above flowchart, RunStep is exited and the failure is written to a read only hidden file; a casual operator would be unaware of the file and unable to locate it and could not therefore work out what went wrong and how to bypass the fault, i.e. he would be forced to reject the component or re-run the test until it was satisfactory.

Although illustrative embodiments have been shown and described, a wide range of modifications, change and substitution is contemplated in the foregoing disclosure and in some instances, some features of the embodiments may be employed without a corresponding use of the other features. Accordingly, it is appropriate that the appended claims be construed broadly and in a manner consistent with the scope of the embodiments disclosed herein.

What is claimed:

1. A method of installing software on a computer system, comprising:

providing a step sequence including a plurality of software installation steps to be executed in an order determined by the step sequence;

reading and executing consecutive steps from the step sequence; and prior to the execution of each step, reading a directory list of all files in a local drive of the computer system executing the step sequence into a memory of said computer system.

2. A method as claimed in claim 1, further comprising:

prior to the execution of each step, disabling a control-break to prevent an operator breaking out of the step sequence to bypass a step.

3. A method as claimed in claim 1 wherein providing a step sequence comprises:

reading a plurality of component descriptors from a computer readable file, each component descriptor describing a respective component of the computer system;

reading a plurality of steps from a database, each step being associated with a component descriptor and including a respective sequence number; and sequencing the plurality of steps in a predetermined order according to the sequence numbers to provide the step sequence.

4. A method as claimed in claim 1, further comprising:

writing the step sequence to a non volatile storage media configured to accompany the computer system during manufacture.

5. A method as claimed in claim 1, wherein the step sequence is adapted to provide for commands repeatable for a defined length of time.

6. A method as claimed in claim 1, wherein the step sequence is adapted to provide for commands repeatable for a defined number of iterations.

7. A method as defined in claim 1, comprising:

updating, in respect of each step which is executed, a progress file with data relating to the current status of the software installation; and prior to the execution of each step, determining from the file if that step is properly the next consecutive step in the step sequence.

8. A method as defined in claim 7 wherein the progress file contains the line number in the step sequence of the last step executed and the command executed at that step.

9. A method of testing a computer system comprising:

providing a step sequence including a plurality of software installation steps to be executed in an order determined by the step sequence;

reading and executing consecutive steps from the step sequence; and prior to execution of each step, reading a directory list of all files on a local drive of the computer system executing the step sequence into a memory of said computer system.

* * * * *